United States Patent [19]

Takeuchi et al.

[11] 4,389,871
[45] Jun. 28, 1983

[54] METHOD OF PRODUCING YOKE OF ROTARY ELECTRIC MACHINE

[75] Inventors: Hidetsugu Takeuchi, Kariya; Tsuyoshi Muramatsu; Shozo Kato, both of Toyoake, all of Japan

[73] Assignee: Nippondenso Co., Ltd., Kariya, Japan

[21] Appl. No.: 206,180

[22] Filed: Nov. 12, 1980

[30] Foreign Application Priority Data

Nov. 23, 1979 [JP] Japan .................................. 54-152302

[51] Int. Cl.$^3$ ............................................ B21D 22/02
[52] U.S. Cl. ......................................... 72/356; 72/354
[58] Field of Search .................................. 72/352-356

[56] References Cited

U.S. PATENT DOCUMENTS

| | | | |
|---|---|---|---|
| 3,101,534 | 8/1963 | Large | 72/356 X |
| 3,491,576 | 1/1970 | Tomiji et al. | 72/356 |
| 4,253,323 | 5/1981 | Marakami | 72/356 |

Primary Examiner—Leon Gilden
Attorney, Agent, or Firm—Cushman, Darby & Cushman

[57] ABSTRACT

A method of producing a yoke of a rotary electric machine wherein a cylindrical blank is formed comprises extrusion forming a semi-finished article having abutting surfaces at axial opposite ends in the first step. The abutting surfaces are subjected to coining in the second step whereby the two abutting surfaces can have a spacing interval of high accuracy and can be disposed parallel to each other.

2 Claims, 9 Drawing Figures

METHOD OF PRODUCING YOKE OF ROTARY ELECTRIC MACHINE

BACKGROUND OF THE INVENTION

1. Field of the Invention

This invention relates to methods of producing yokes each constituting a field section of a rotary electric machine, and more particularly it is concerned with a method of producing a yoke suitable for use in a DC machine for an automotive vehicle, such as a starter.

2. Description of the Prior Art

A yoke constituting a field section of a rotary electric machine is cylindrical in shape and securely fixed between two frames forming an outer shell of the machine, such as a DC machine, when assembled. A yoke usually has two abutting surfaces on axial opposite ends thereof which are to be positioned against the frames. In producing a yoke, it has hitherto been mandatory to finish the yoke in such a manner that its inner diameter has high dimensional accuracy and its abutting surfaces are parallel to each other and spaced apart a predetermined distance.

In one method of producing this type of yoke known in the art, a strip of suitable material is rounded into a cylindrical shape which is welded at opposite sides, the cylinder is subjected to ironing at its outer or inner periphery so that its inner diameter will have an accurate value, and then abutting surfaces to be positioned against the frames are machined. The method described above has generally been used for producing yokes of high precision finishes. This method has, however, the disadvantage that it has many process steps resulting in increased costs. Also, machining of the abutting surfaces has produced waste of material.

SUMMARY OF THE INVENTION

This invention has been developed for the purpose of obviating the aforesaid disadvantages of the prior art. Accordingly, the invention has as its object the provision of a method of producing a yoke of a rotary electric machine capable of producing the yoke of high dimensional accuracy and parallelism by following a smaller number of process steps than the method of the prior art and conserving material.

According to the invention, there is provided a method of producing a yoke of a rotary electric machine, cylindrical in shape and having abutting surfaces formed on axial opposite ends thereof which are to be positioned against frames of the machine, which comprises the first step of forming a cylindrical blank into a semi-finished article having the abutting surfaces on the axial opposite ends thereof by extrusion forming, and the second step of subjecting the abutting surfaces on the axial opposite ends of the semi-finished article to coining whereby the abutting surfaces can have parallelism with a predetermined spacing interval of an accurate dimension therebetween.

DESCRIPTION OF THE PREFERRED EMBODIMENTS

Figure 1:
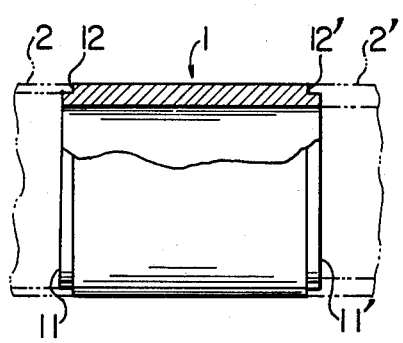
FIG. 1 is a fragmentary sectional view of the yoke produced by the method according to the invention.

FIG. 1 shows the yoke produced by the method according to the invention. The yoke 1 is cylindrical in shape and constructed to be securely fixed between left and right frames 2 and 2' constituting an outer shell of a rotary electric machine when the yoke 1 is used therewith. To this end, the yoke 1 is formed at its axial opposite ends with fitting portions 11 and 11' and abutting surfaces 12 and 12' formed when the fitting portions 11 and 11' are formed to be positioned against the frames 2 and 2', respectively. The yoke 1 should be shaped such that the inner diameter of the yoke, the outer diameter of the fitting portions 11 and 11', the spacing interval between the abutting surfaces 12 and 12' and the parallelism of the abutting surfaces 12 and 12' are all highly accurate.

Figure 2:
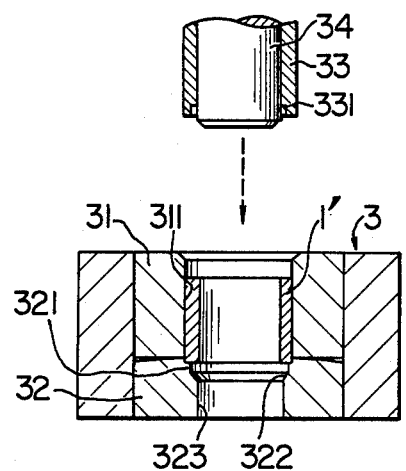
FIGS. 2-5 show the process of production of the yoke shown in FIG. 1, FIG. 2 being a sectional front view of a yoke blank set in an extrusion forming machine in the first step, FIG. 3 being a sectional front view of the yoke blank upon completion of extrusion forming, FIG. 4 being a sectional front view of a semi-finished article set in a coining machine in the second step, and FIG. 5 being a sectional front view of the article upon completion of coining.

FIG. 2 shows an extrusion forming machine used in the first step of the method according to the invention. The extrusion forming machine 3 comprises an upper die 31, a lower die 32, a punch 33 and a mandrel 34. The upper die 31 is formed with a bore 311 of a uniform inner diameter. The lower die 32 forming a pair with the upper die 31 is formed with a bore including a first bore 321 of a smaller diameter than the bore 311, a second bore 323 of a diameter smaller than the first bore 321 and having a third tapered bore 322 therebetween. The punch 33 is cylindrical in shape and has an outer diameter enabling the punch 33 to be intimately fitted in the bore 311 of the upper die 31. The punch 33 is slidably fitted over the outer periphery of the mandrel 34 and formed on the inner periphery of its forward end (lower end) with a recess 331. The extrusion forming machine 3 has the following dimensions: the inner diameter of the bore 311 of the upper die 31 is equal to the outer diameter of the yoke 1; the inner diameter of the first bore 321 of the lower die 32 is equal to the outer diameter of the fitting portion 11 at one end of the yoke 1; the inner diameter of the recess 331 of the punch 33 is equal to the outer diameter of the fitting portion 11' at the other end of the yoke 1; and the outer diameter of the mandrel 34 is equal to the inner diameter of the yoke 1.

Figure 3:
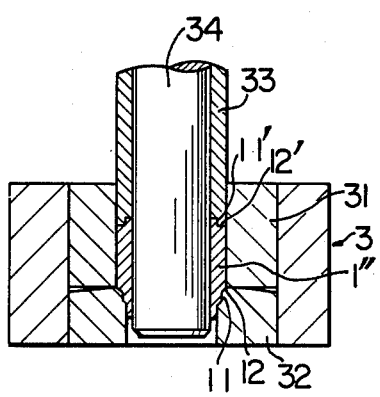

In the invention, the yoke 1 is produced by working a cylindrical blank 1'. The cylindrical blank 1' is set in the bore 311 of the upper die 31 of the extrusion forming machine 3, as shown in FIG. 2. Then, as shown in FIG. 3, the mandrel 34 is inserted in the cylindrical blank 1', and the punch 33 is moved downwardly into the bore 311 of the upper die 31, to apply pressure to the cylindrical blank 1'. The cylindrical blank 1' is thus subjected to extrusion forming, so that the material of the cylindrical blank 1' fills the bore 311 of the upper die 31, the first bore 321 of the lower die 32, a space defined by the forward end of the punch 33 and the outer periphery of the mandrel 34. The excess material is ejected into the second bore 323 of the lower die 32. The opposite ends of the extrusion-formed blank 1' have their shape determined by the shape of the bores 321 and 323 of the lower die 32 and the forward end of the punch 33.

Extrusion forming of the cylindrical blank 1' produces a cylindrical semi-finished article 1'' which is formed at the outer periphery of one axial end thereof with the fitting portion 11 formed by the first bore 321 of the lower die 32 and the abutting surface 12 formed by the upper surface of the lower die 32 and at the outer periphery of the other axial end thereof with the fitting portion 11' formed by the recess 331 of the punch 33 and the abutting surface 12' formed by the forward end of the punch 33. The semi-finished article 1'' has its inner diameter determined by the mandrel 34, while the outer diameter of one fitting portion 11 is determined by the lower die 32 and the outer diameter of the other fitting portion 11' is determined by the punch 33. These parts all have high dimensional accuracy on surfaces parallel to the direction of extrusion. However, the two abutting surfaces 12 and 12' which are disposed perpendicular to the direction of extrusion may not have high dimensional accuracy.

Figure 4:
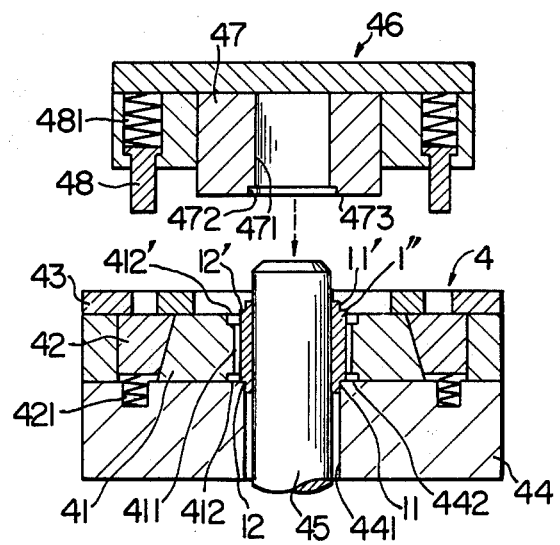

FIG. 4 shows a coining machine used in the second step of the method according to the invention. The coining machine 4 comprises a die 41 peripherally split into a plurality of die members cooperating to define a bore 411 formed with grooves 412 and 412' at upper and lower ends thereof respectively. The die members 41 are tapered at their outer peripheries and surrounded by a tapered wedge 42 having a tapered inner periphery complementary with the outer peripheries of the die members 41. Normally, the tapered wedge 42 is moved upwardly by the biasing force of a spring 421 to an upper position in which it abuts against a stopper plate 43 disposed on the top of the die 41, and the die members 41 are moved outwardly to an expanded position by the biasing forces of springs, not shown, each interposed between the die members. Downward movement of the tapered wedge 42 moves the die members 41 radially toward one another into a contracted position.

A lower pressing plate 44 is disposed under the die members 41 and formed with a bore 441 coaxial with a bore 411 of the die members 41. The lower pressing plate 44 is formed on its surface with a planar portion 442 at least around the bore 441, and a mandrel 45 extends through the bore 411 of the die members 41 and the bore 441 of the lower pressing plate 44 coaxially therewith.

Meanwhile a ram 46 includes an upper pressing plate 47 formed with a bore 471 adapted to receive the mandrel 45 therein and a recess 472 at its forward end (lower end). A planar surface 473 is provided on the forward end (underside) of the upper pressing plate 47 at least around the recess 472. The ram 46 also includes a plurality of cylinder-rod assemblies 48 disposed in positions each corresponding to one of the tapered wedges 42 of the coining machine 4 and each pressed downwardly by the biasing force of a spring 481. The cylinder-rod assemblies 48 have the function of moving the tapered wedges 42 downwardly.

In the coining machine 4 of the aforesaid construction, the dimensions of the parts are selected as follows: the inner diameter of the bore 441 of the lower pressing plate 44 is equal to the outer diameter of the fitting portion 11 at one end of the semi-finished article 1''; the outer diameter of the mandrel 45 is equal to the inner diameter of the semi-finished article 1''; and the inner diameter of the recess 472 of the upper pressing plate 47 is equal to the outer diameter of the fitting portion 11' at the other end of the semi-finished article 1''.

Figure 5:
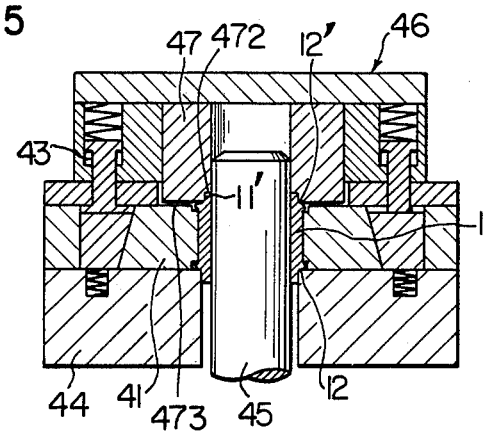

The semi-finished article 1'' formed by extrusion forming as aforesaid has excess material at one end thereof severed therefrom, when necessary, and is set in the coining machine 4 as shown in FIG. 4. More specifically, in setting the semi-finished article 1'' in the coining machine 4, the semi-finished article 1'' is fitted over the mandrel 45 and set in the bore 411 of the die members 41 in such a manner that the fitting portion 11 at one end is inerted in the bore 441 of the lower pressing plate 44 and the abutting surface 12 is placed on the planar surface 442 of the upper surface of the lower pressing plate 44. Then the ram 46 is moved downwardly. The downward movement of the ram 46 causes the cylinder-rod assemblies 48 to move the tapered wedges 42 downwardly, to thereby move the die members 41 inwardly from the expanded position to the contracted position. Thus the bore 411 is narrowed and the die members 41 are brought into engagement with the outer periphery of the semi-finished article 1'' to keep the latter in pressed condition. As shown in FIG. 5, pressure is applied to the semi-finished article 1'' while the fitting portion 11' at the other end of the article 1'' is being fitted in the recess 472 of the upper pressing plate 47 and the abutting surface 12' at the other end of the article 1'' is being positioned against the planar surface 473 of the underside of the upper pressing plate 47. By this arrangement, the abutting surfaces 12 and 12' are coined by the lower pressing plate 44 and the upper pressing plate 47 respectively, to give finishing touches to the abutting surfaces 12 and 12' so that they have correct parallelism and an acurate spacing interval. Thus production of the yoke 1 is completed.

During a coining operation, the semi-finished article 1'' has its outer periphery pressed by the die members 41 as aforesaid. This avoids expansion deformation of the article 1'' outwardly thereof. Excess material produced by coining of the abutting surfaces 12 and 12' is ejected into the grooves 412 and 412' at the upper and lower ends of the bore 411 respectively. The yoke 1 is removed, after being completed, from the coining machine 4 by moving the ram 46 upwardly and moving the die members 41 to the expanded position.

By the aforesaid coining operation, the abutting surfaces 12 and 12' at the opposite ends of the yoke 1 can be finished such that the spacing interval between them has a predetermined value and they are parallel to each other. Thus by the method according to the invention, it is possible to produce the yoke 1 of high dimensional accuracy and correct parallelism by following a small number of process steps consisting of extrusion forming and coining and with minimized waste of material.

Figure 6:
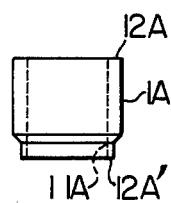
FIG. 6 is a front view of a modification of the yoke shown in FIG. 1.
Figure 7:
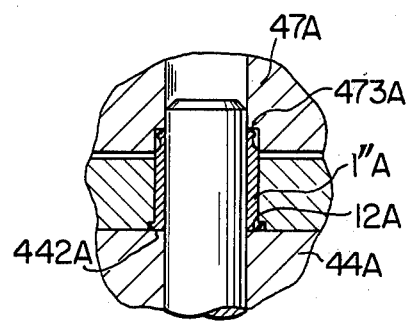
FIG. 7 is a sectional front view of the essential portion of the yoke shown in FIG. 6 being subjected to coining.

FIG. 6 shows a modification of the yoke 1 according to the invention. As shown, the yoke 1A uses its inner peripheral surface 11A as a fitting portion and opposite end surfaces thereof serve as abutting surfaces 12A and 12A'. High accuracy in the spacing interval between the abutting surfaces 12A and 12A' and the parallelism thereof is required of the yoke 1A. In producing the yoke 1A, a semi-finished article 1''A is subjected to coining by using a lower pressing plate 44A formed with a planar surface 442A corresponding to the planar abutting surface 12A at one end of article 1''A and an upper pressing plate 47A formed with a planar surface 473A corresponding to the planar abutting surface 12A' at the other end of the article 1"A as shown in FIG. 7. By this arrangement, the abutting surfaces 12A and 12A' can have a spacing interval and parallelism of high accuracy.

Figure 8:
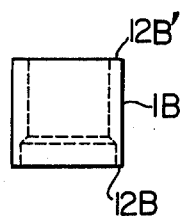
FIG. 8 is a front view of another modification of the yoke shown in FIG. 1.
Figure 9:
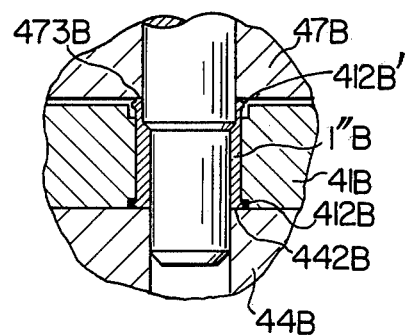
FIG. 9 is a sectional front view of the essential portions of the yoke shown in FIG. 8 being subjected to coining.

FIG. 8 shows still another modification of the yoke 1. As shown, the yoke 1B also uses its inner peripheral surface as a fitting portion and its opposite end surfaces as abutting surfaces 12B and 12B'. In producing the yoke 1B, a semi-finished article 1"B is subjected to coining by a planar surface 442B formed on a lower pressing plate 44B and a planar surface 473B formed on an upper pressing surface 47B. Local deformation of the article 1"B caused by coining is absorbed by gaps 412B and 412B'.

From the foregoing description, it will be appreciated that the present invention provides a method of producing a yoke from a cylindrical blank by extrusion forming and coining. The invention achieves the effects of producing a yoke of high dimensional accuracy and correct parallelism by following a small number of process steps and minimizing production of waste material.

What is claimed is:

1. A method of producing a yoke for a rotary electric machine having a cylindrical shape and formed with abutting surfaces on opposite axial ends thereof to be positioned against frames of the machine, said method comprising the steps of:

forming a cylindrical blank by extrusion forming into a semi-finished article having said abutting surfaces formed on its axially opposite ends; and coining said abutting surfaces while said semi-finished article is on a mandrel to prevent radially inward deformation of said article but causing radially outward deformation thereof at the article ends axially inward from but adjacent said abutting surfaces while pressing inwardly on the outer periphery of said semi-finished article between said ends thereof to prevent any radially outward expansion deformation of said article between said ends while said coining causes said two abutting surfaces to have a spacing interval of high accuracy and to be square relative to said mandrel and parallel to each other.

2. A method as in claim 1 wherein said coining is effected by increasing axial pressure on said opposite ends, said method further including increasing the inward pressure on said outer periphery of the article as said axial pressure increases.

* * * * *